US009119057B2

(12) United States Patent
Robson et al.

(10) Patent No.: US 9,119,057 B2
(45) Date of Patent: Aug. 25, 2015

(54) LOCATION-AWARE EMERGENCY BROADCAST RECEIVER

(75) Inventors: Stephen James Robson, Garran (AU); Simon Bolivar Blyth, Lane Cove (AU)

(73) Assignee: Advanced Alert Pty Ltd., Yeppoon, Queensland (AU)

( * ) Notice: Subject to any disclaimer, the term of this patent is extended or adjusted under 35 U.S.C. 154(b) by 217 days.

(21) Appl. No.: 13/580,944

(22) PCT Filed: May 5, 2011

(86) PCT No.: PCT/AU2011/000523
§ 371 (c)(1),
(2), (4) Date: Dec. 19, 2012

(87) PCT Pub. No.: WO2011/137495
PCT Pub. Date: Nov. 10, 2011

(65) Prior Publication Data
US 2013/0217354 A1 Aug. 22, 2013

(30) Foreign Application Priority Data
May 6, 2010 (AU) ................................ 2010901940

(51) Int. Cl.
*H04W 4/22* (2009.01)
*G08B 27/00* (2006.01)

(52) U.S. Cl.
CPC ............... *H04W 4/22* (2013.01); *G08B 27/008* (2013.01)

(58) Field of Classification Search
CPC ......... H04W 52/02; H04W 4/06; H04W 4/22; G06F 17/00
See application file for complete search history.

(56) References Cited

U.S. PATENT DOCUMENTS

| 7,679,505 B1 | 3/2010 | Vallaire | |
|---|---|---|---|
| 2009/0093956 A1* | 4/2009 | Wu et al. | 701/213 |
| 2011/0040981 A1* | 2/2011 | Lindahl et al. | 713/189 |

FOREIGN PATENT DOCUMENTS

JP 2007-081516 * 3/2007 ............ H04W 52/02

OTHER PUBLICATIONS

International Search Report from corresponding International Application No. PCT/AU11/000523 dated Jul. 12, 2011.

* cited by examiner

*Primary Examiner* — Myron K Wyche
(74) *Attorney, Agent, or Firm* — Allan W. Watts; Bryan Cave LLP

(57) ABSTRACT

Disclosed is an emergency broadcast receiver. The receiver comprises an alert device, a tuner adapted to demodulate a baseband signal from a radio frequency signal, a signal decoder adapted to extract digital data from the demodulated baseband signal, a location device adapted to provide location data representing a location of the emergency broadcast receiver; and an embedded controller. The embedded controller is adapted to detect a trigger signal in the extracted digital data, determine whether location information encoded in the detected trigger signal corresponds with the location data; and activate, based on the determination, the alert device.

15 Claims, 8 Drawing Sheets

LOCATION-AWARE EMERGENCY BROADCAST RECEIVER

CROSS-REFERENCE TO RELATED APPLICATIONS

This application is a national stage application under 35 U.S.C. 371 of and claims priority to International Application No. PCT/AU11/00523 filed May 5, 2011, which application claims the benefit of Australian Application No. 2010901940 filed May 6, 2010. International Application No. PCT/AU11/00523 and Australian Application No. 2010901940 are incorporated herein by reference.

TECHNICAL FIELD

The present invention relates generally to radio receivers and, in particular, to a radio receiver for detecting an emergency signal and receiving emergency broadcast bulletins.

BACKGROUND

Rapidly unfolding natural or man-made disasters or emergencies such as bushfires, cyclones, and tsunamis have the potential to affect large numbers of people in a short time, with consequential risk to life and property. Such emergencies, which are often of long duration (several days), can evolve unpredictably, so that the population affected by the emergency can change at short notice. The risk to life and property is greatly reduced if people likely to be affected are made aware of the threat and informed of preventive or palliative measures (e.g. evacuation, retreat to shelters) in advance of the actual onset of the emergency.

However, people do not always gather information on an evolving emergency in the same manner. Some people may monitor a certain television station, others a certain radio station, some the Internet, and some may rely on word of mouth. In addition their monitoring may not be constant, but rather intermittent. This presents a challenge to authorities wishing to keep people informed about an emergency developing rapidly in their area of responsibility.

Known solutions including sirens and loudspeakers in public places either fail to reach many affected people or lack informative content. It is expensive and perhaps impractical to ensure wide coverage by broadcasting constant emergency update bulletins on every channel of every possible broadcast medium. Also for a potentially affected person, it can be exhausting to remain alert for updates on an evolving emergency day and night for days on end. These problems may also be exacerbated in remote or Third World regions where communications resources may be limited.

Further, emergencies affect, or have the potential to affect, different geographic areas at different times. It is wasteful and ultimately counter-productive for authorities to raise alerts concerning emergencies in areas not affected by that emergency. Therefore, some degree of selectivity by geographic area is desirable for emergency alerts.

Finally, safety-critical devices, by definition, cannot afford to fail for predictable reasons. Conventionally, self-contained emergency devices such as smoke alarms periodically test themselves for proper functioning, e.g. by sampling the battery charge level, and alert the owner if proper functioning is impaired. However, an emergency alert system can fail because of the receiver or the transmitter. It is therefore desirable for an emergency alert device to be able to monitor the transmitter for proper functioning, in addition to monitoring its own functioning.

SUMMARY

It is an object of the present invention to substantially overcome, or at least ameliorate, one or more disadvantages of existing arrangements.

Disclosed is an emergency broadcast receiver that is location-aware, and is therefore able to respond selectively to emergency alerts that are location-specific. Also disclosed is an emergency broadcast receiver that, in addition, to checking for emergency alerts, conducts a periodic "heartbeat check" both of its own functioning and that of the transmitter(s) participating in the emergency alert system.

According to a first aspect of the present disclosure, there is provided an emergency broadcast receiver, comprising: an alert device; a tuner adapted to demodulate a baseband signal from a radio frequency signal; a signal decoder adapted to extract digital data from the demodulated baseband signal; a location device adapted to provide location data representing a location of the emergency broadcast receiver; and an embedded controller adapted to detect a trigger signal in the extracted digital data, determine whether location information encoded in the detected trigger signal corresponds with the location data; and activate, based on the determination, the alert device.

According to a second aspect of the present disclosure, there is provided an emergency broadcast receiver comprising an alert device; a tuner adapted to demodulate a baseband signal from a radio frequency signal; an analog-to-digital converter adapted to convert the demodulated baseband signal to digital data; a location device adapted to provide location data representing a location of the emergency broadcast receiver; and an embedded controller adapted to: detect a trigger signal in the digital data, determine whether location information encoded in the detected trigger signal corresponds with the location data; and activate, based on the determination, the alert device.

According to a third aspect of the present disclosure, there is provided an emergency alert system comprising an operator terminal adapted to provide location information representing an area associated with an emergency, a transmitter station adapted to broadcast a trigger signal including the location information received from the operator terminal, and an emergency broadcast receiver adapted to receive the broadcast trigger signal and to respond selectively to the received trigger signal depending on the encoded location information and location data representing a location of the emergency broadcast receiver.

According to a further aspect of the present disclosure, there is provided an emergency broadcast receiver comprising: an alert device; a tuner adapted to demodulate a baseband signal from a radio frequency signal in a current one of a predetermined number of channels; a signal decoder adapted to extract digital data from the demodulated baseband signal; and an embedded controller adapted to determine periodically whether the extracted digital data represents a valid data stream in the current channel, and based on the determining, change the current channel at which the tuner demodulates to a different channel of the predetermined number of channels.

DESCRIPTION OF THE DRAWINGS

At least one embodiment of the present invention will now be described with reference to the drawings, in which.

DETAILED DESCRIPTION

Figure 1:
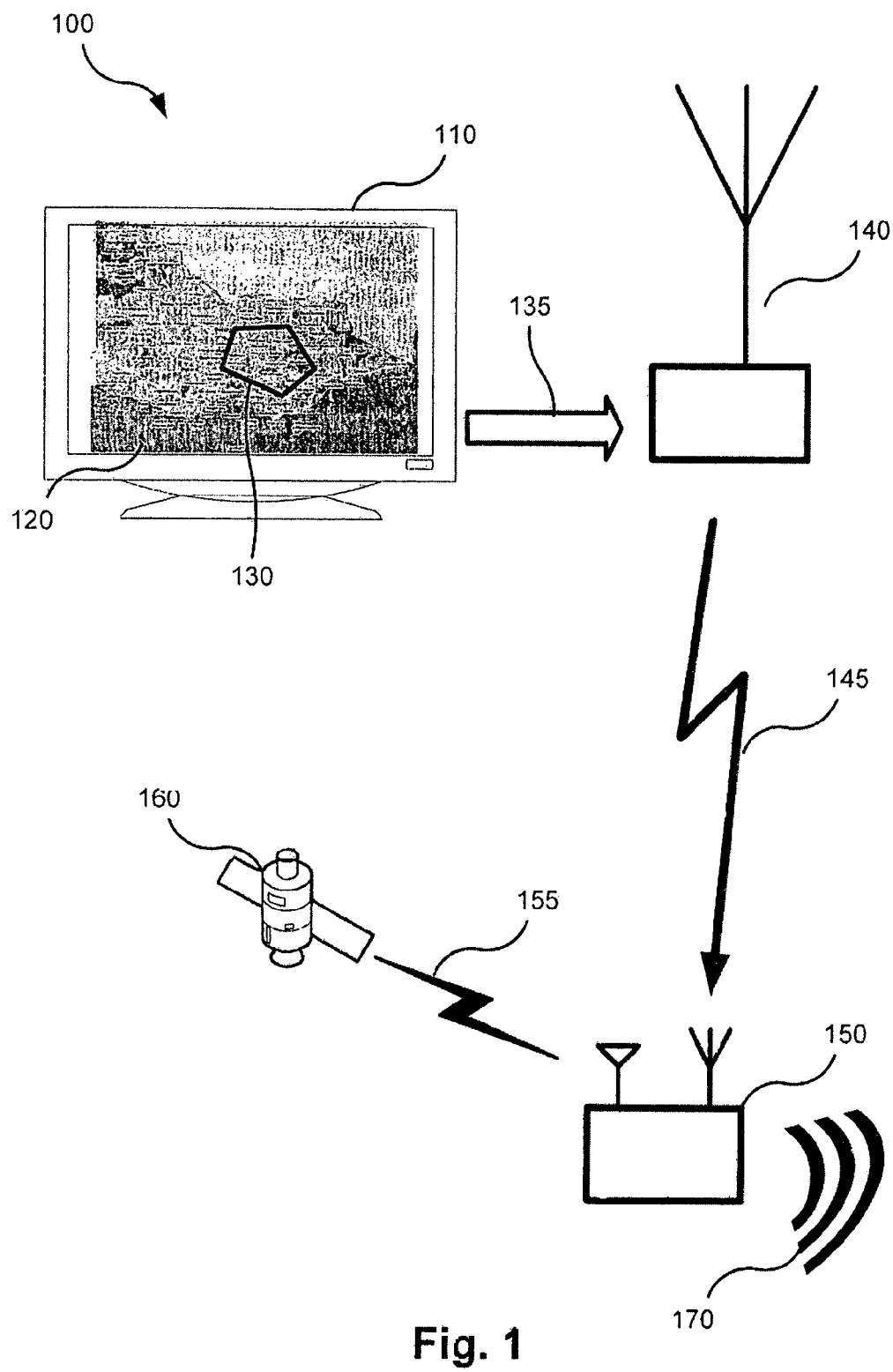
FIG. 1 is a diagram of an exemplary emergency alert system within which the embodiments of the invention may be practised.

Where reference is made in any one or more of the accompanying drawings to steps and/or features, which have the same reference numerals, those steps and/or features have for the purposes of this description the same function(s) or operation(s), unless the contrary intention appears.

FIG. 1 is a diagram of an exemplary emergency alert system 100 within which the embodiments of the invention may be practised. The emergency alert system 100 includes a terminal 110 operated on behalf of the emergency authorities (e.g. police, fire, military). An operator, in possession of details about an evolving emergency, views a map 120 of a region likely to be affected by the emergency. Using an interface device, the operator scribes out an area 130 on the map 120, thereby specifying location information defining an area potentially affected by the emergency and within which an emergency alert is to be enabled. The terminal 110 encodes the location information defining the area 130 and transmits the encoded location information 135 to at least one transmitter station 140. The or each transmitter station 140 broadcasts a "trigger signal" 145 that includes the encoded location information 135 to the area of service of the transmitter station 140. An emergency broadcast receiver 150 located within the region of service of the transmitter station 140 receives and recognises the "trigger signal" 145 and decodes the location information 135 encoded therein. The emergency broadcast receiver 150 also receives signals 155 from one or more satellites 160 from which the emergency broadcast receiver 150 computes its present geographical location. The emergency broadcast receiver 150 then compares its present location with the area 130 defined by the location information 135 decoded from the trigger signal 145. If the present location is within the defined area 130, the emergency broadcast receiver 150 sounds an emergency alert tone 170 to alert an owner or possessor of the emergency broadcast receiver 150 to take action in response to the emergency. The emergency broadcast receiver 150 is thus "location-aware" and can respond selectively to emergency alerts depending on its location and the area to which the emergency alert is targeted. The transmitter station 140 may be dedicated for the purpose of transmitting the trigger signal 145, or alternatively may be a public broadcast radio transmitter operating in the AM, FM, or Short Wave bands and to which the trigger signal 145 may supplement programme information.

Figure 2A:
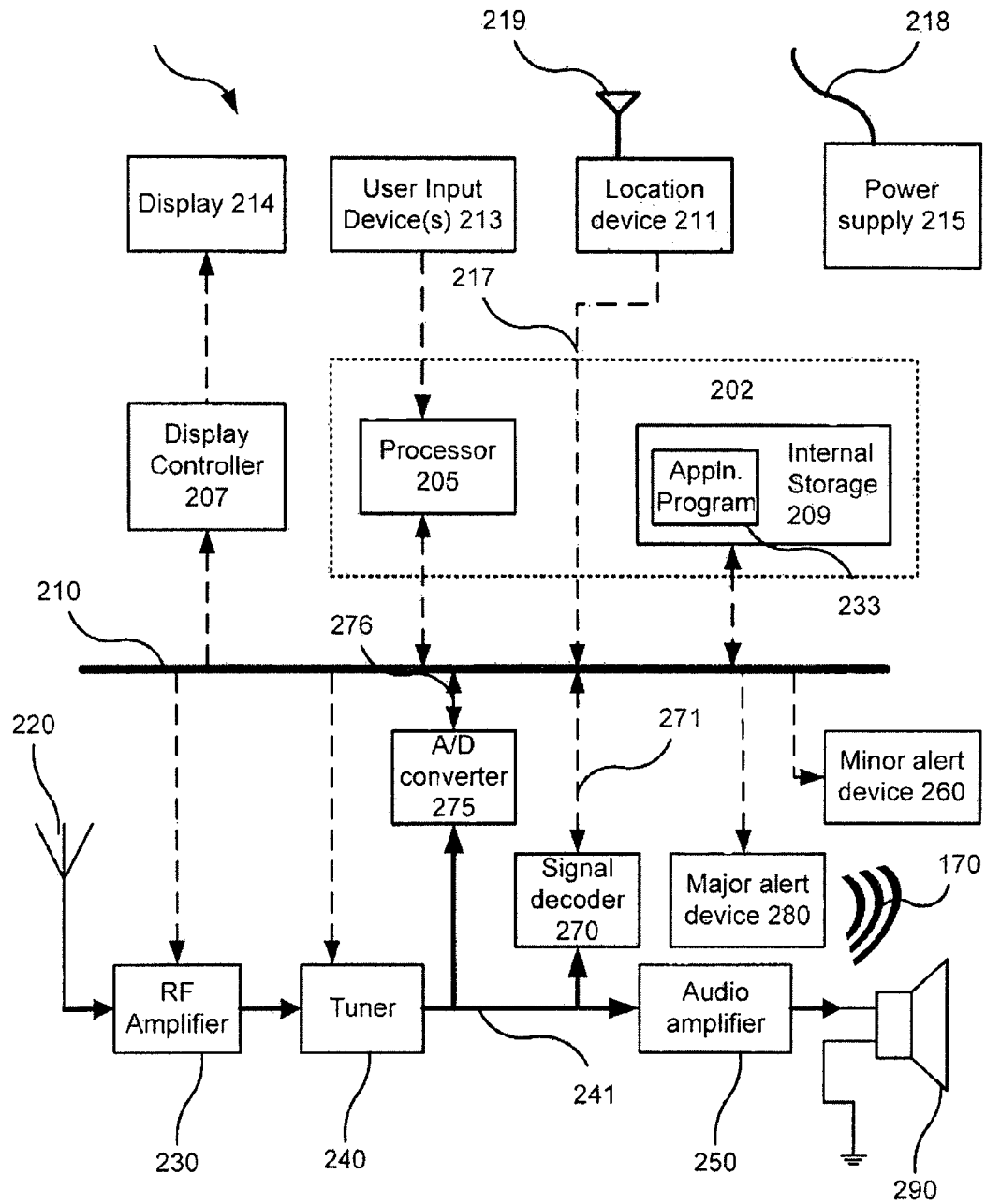
FIGS. 2A and 2B collectively form a schematic block diagram representation of an emergency broadcast receiver exemplifying the emergency broadcast receiver of the emergency alert system of FIG. 1 according to a first embodiment.
Figure 2B:
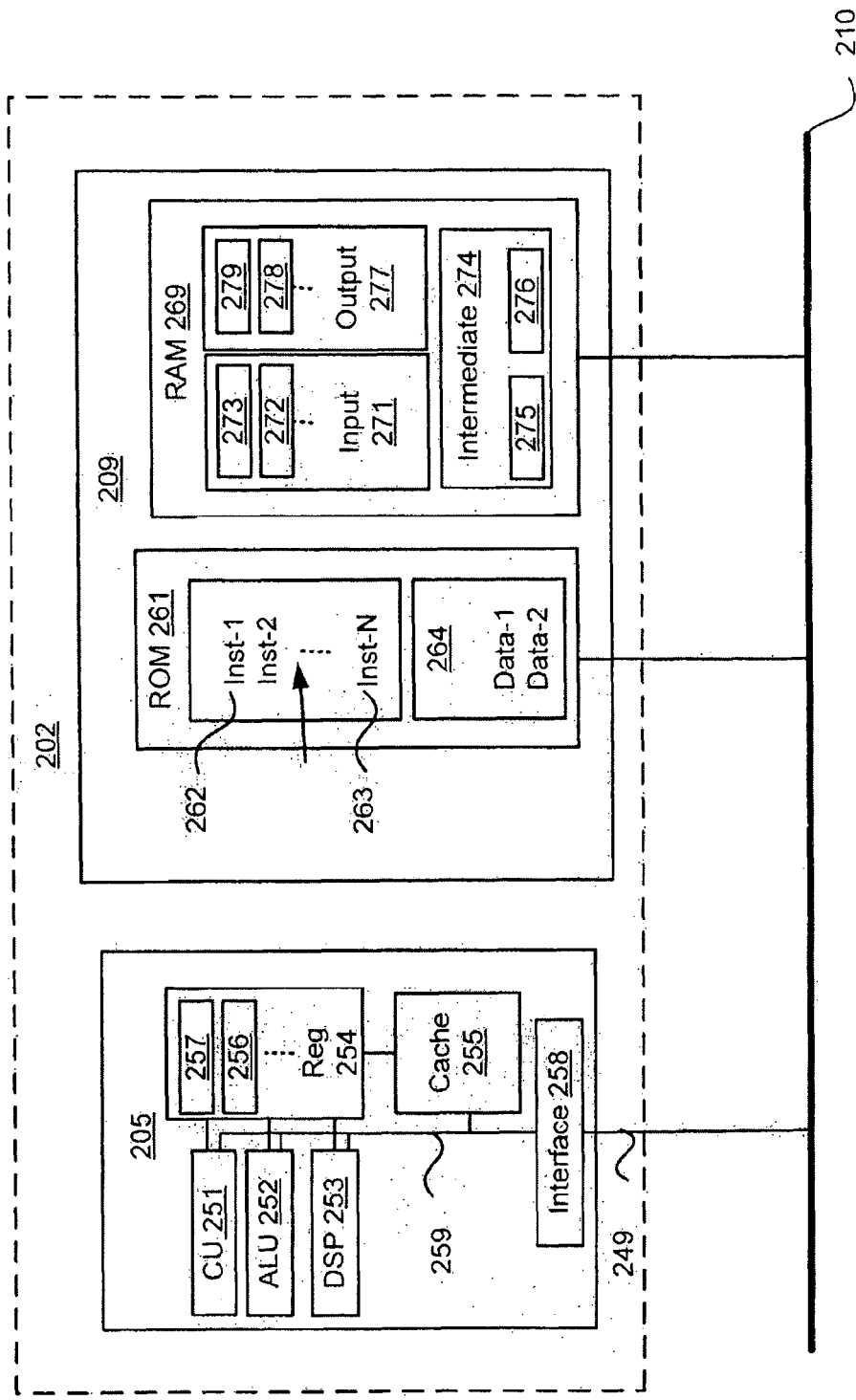

FIGS. 2A and 2B collectively form a schematic block diagram of an emergency broadcast receiver 200 exemplifying the emergency broadcast receiver 150 of the emergency alert system 100 according to a first embodiment. The emergency broadcast receiver 200, in addition to its emergency broadcast reception function, is adapted to function as a conventional radio receiver. The emergency broadcast receiver 200 can be a standalone (e.g. portable) radio, a radio that is fitted to a transport vehicle such as a car, or a specialised alert device adapted for use in a public place such as a beach or town square.

As seen in FIG. 2A, the emergency broadcast receiver 200 comprises an analog signal path marked with solid arrow lines. The analog signal path starts at an aerial 220, which wirelessly detects a radio frequency (RF) signal, such as the signal 145. The detected RF signal from the aerial 220 is amplified by an RF amplifier 230 and passed to a tuner 240. The tuner 240 is adapted to demodulate the amplified RF signal in a selected channel in a selected band (e.g. AM or FM) to a baseband signal 241. The baseband signal 241, comprising primarily audio-frequency information, is amplified by the audio amplifier 250 before being transduced into an acoustic signal by the loudspeaker 290. In the case where the emergency broadcast receiver 200 is for use in a public place, the loudspeaker 290 may be replaced by an audio interface adapted for connection to a public address system.

The emergency broadcast receiver 200 also comprises a minor alert device 260 and a major alert device 280. The minor alert device 260 and the major alert device 280 are adapted to alert the user in some fashion under the circumstances to be described below. The minor alert device 260 and the major alert device 280 are so named because the minor alert device 260 is adapted to alert the user in a lower-key or perceptually less urgent fashion than the major alert device 280. Examples of a minor alert device 260 are a steady or flashing light-emitting diode (LED) or LEDs, or a soft audio beep or "chirp" tone emitter. Examples of a major alert device 280 are high-powered steady or flashing LEDs; a high-pitched piezoelectric audio tone emitter; or a low frequency tone emitter adapted to alert the hearing impaired. The alert issued by the major alert device 280 may be identified with the emergency alert tone 170. In the case where the emergency broadcast receiver 200 is for use in a public place, the major alert device 280 may be an interface adapted for connection to a loudspeaker, siren, or high-powered floodlight, or a combination of these.

The emergency broadcast receiver 200 also comprises an embedded controller 202. In the present example, the controller 202 has a processing unit (or processor) 205 which is bi-directionally coupled to an internal storage module 209. The storage module 209 may be formed from non-volatile semiconductor read only memory (ROM) 261 and semiconductor random access memory (RAM) 269, as seen in FIG. 2B. The RAM 269 may be volatile, non-volatile or a combination of volatile and non-volatile memory.

The demodulated baseband signal 241 from the tuner 240 is also passed to a signal decoder 270. The signal decoder 270 is adapted to extract an ancillary digital data stream 271 from the demodulated baseband signal 241 according to a predetermined protocol. Examples of protocols for such ancillary digital information streams in common wireless bands are RDS in the FM band, and AMSS in the AM band.

The demodulated baseband signal 241 from the tuner 240 is also passed to an analog to digital (A/D) converter 275. The A/D converter 275 is adapted to convert the demodulated baseband signal 241 to digital data 276 representing the demodulated baseband signal for subsequent processing by the embedded controller 202.

The function of the tuner 240 in concert with one or both of the signal decoder 270 and the A/D converter 275 is to provide digital data 271 and 276 respectively to be buffered and checked by the embedded controller 202 for the presence of a "trigger signal", e.g. the trigger signal 145, that will cause the major alert device 280 to be activated, as described in detail below. Each form of digital data to be checked for a trigger signal is referred to below as a "trigger modality". In the case of the signal decoder 270, the trigger modality is FM/RDS or AM/AMSS, and the digital data 271 is the RDS or AMSS data. In the case of the A/D converter 275, the digital data 276 represents the baseband signal itself, and the trigger modality is referred to as "FM audio" or "AM audio", since the trigger signal is encoded in the digital data 276 as part of or alongside the audio information. One example of such audio-based encoding is dual-tone multi-frequency (DTMF). In one implementation, the set of trigger modalities (in checking order) comprises FM/RDS, FM audio, and AM audio.

In alternative embodiments, the emergency broadcast receiver 200 comprises further components (not shown) adapted to receive and decode digital data according to other wireless protocols, including but not limited to: GSM, GPRS, satellite, HSDPA, Wi-Fi, WiMax. Such components, if present, function to extract digital data from other trigger modalities to be checked by the emergency broadcast receiver 200 for the presence of a trigger signal.

Each trigger modality comprises one or more predetermined "trigger channels" from which digital data, e.g. 271 or 276, to be checked for the trigger signal is extracted. For example, in the FM/RDS modality each trigger channel corresponds to an FM station with a unique carrier frequency.

The emergency broadcast receiver 200 includes a display controller 207, which is connected to a display 214, such as a liquid crystal display (LCD) panel or the like. The display controller 207 is configured for displaying text on the display 214 in accordance with instructions received from the embedded controller 202, to which the display controller 207 is connected.

The emergency broadcast receiver 200 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Such input devices 213 may be user manipulated to achieve conventional radio receiver operations such as channel tuning, volume control, and the like.

The emergency broadcast receiver 200 also includes a location device 211. The location device 211 provides location data 217 representing the current location of the emergency broadcast receiver 200. One example of such a location device 211 is a global positioning satellite (GPS) receiver/decoder, consistent with the exemplary system 100 of FIG. 1, in which case the location device 211 includes a satellite antenna 219, and the location data 217 represents a point location of the emergency broadcast receiver 200 in latitude/longitude coordinates.

Another example of such a location device 211 is a set of DIP or BCD switches that are manually settable to a short numeric code, such as a postal code (ZIP code), indicating one of a predetermined set of zones into which the general area served by the emergency alert system is partitioned. In this fashion, the emergency broadcast receiver 200 can be manually configured to be "location-aware", where the location is a zone. In such an implementation, referring to FIG. 1, the signal 145 would be encoded with one or more descriptors of such zones, such as postal codes, corresponding to the area 130. Another example of the location device 211 is a simple memory device that is programmed with the location of the emergency broadcast receiver 200 via the user input device 213. With these latter two examples, the satellite 160 would not be required in the system 100.

In one implementation, the location data 217 stored in the memory device comprises multiple numeric codes representing the location of the emergency broadcast receiver 200 at multiple geographic resolutions, for example indicating a state, a region, a municipality, and a suburb. In such an implementation, referring to FIG. 1, the area 130 would be encoded in the signal 145 as one or more zone descriptors at one of the resolutions, for example, one or more suburb descriptors.

The emergency broadcast receiver 200 makes use of the location data 217 provided by the location device 211 in determining whether to respond to a location-specific alert, as described in detail below.

The processor 205 is adapted to communicate with other devices in the emergency broadcast receiver 200 via a system bus 210. Such devices include the internal storage module 209, the display controller 207, the location device 211, the RF amplifier 230, the tuner 240, the audio amplifier 250, the signal decoder 270, the A/D converter 275, the minor alert device 260, and the major alert device 280. The flows of digital control signals from, and/or data signals to, the processor 205 to/from each such device via the system bus 210 are represented in FIG. 2A by dashed arrows to distinguish those signals from the analog signal path.

Each device in the emergency broadcast receiver 200 is powered by a power supply 215. The power supply 215 can be a battery, a DC power supply connected to mains electricity via a connection 218 with a battery backup, or an interface connectable to an external power supply such as a car battery or a solar panel.

The analog devices 230, 240, 250, 260, 270, 275, and 280 have two modes of operation: an inactive or "sleep" mode in which they consume little power, and an "active" mode in which they perform their respective functions and consume power. The analog devices 230, 240, 250, 260, 270, 275, and 280 are adapted to switch between these modes in response to control signals received from the processor 205 via the system bus 210.

The methods described hereinafter may be implemented using the embedded controller 202, as one or more software application programs 233 executable within the embedded controller 202. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 261 of the internal storage module 209. The software 233 stored in the ROM 261 can be updated when required from a computer readable medium. The software 233 can be loaded into and executed by the processor 205. In some instances, the processor 205 may execute software instructions that are located in RAM 269. Software instructions may be loaded into the RAM 270 by the processor 205 initiating a copy of one or more code modules from ROM 261 into RAM 269. Alternatively, the software instructions of one or more code modules may be pre-installed in a non-volatile region of RAM 269 by a manufacturer. After one or more code modules have been located in RAM 269, the processor 205 may execute software instructions of the one or more code modules.

The application program 233 is typically pre-installed and stored in the ROM 261 by a manufacturer, prior to distribution of the emergency broadcast receiver 200.

The second part of the application programs 233 and the corresponding code modules mentioned above may be executed to implement one or more graphical user interfaces (GUIs) to be rendered or otherwise represented upon the display 214 of FIG. 2A. Through manipulation of the user input device 213 (e.g., the keypad), a user of the emergency broadcast receiver 200 and the application programs 233 may manipulate the interface in a functionally adaptable manner to provide controlling commands and/or input to the applications associated with the GUI(s).

FIG. 2B illustrates in detail the embedded controller 202 having the processor 205 for executing the application programs 233 and the internal storage 209. The internal storage 209 comprises read only memory (ROM) 261 and random access memory (RAM) 269. The processor 205 is able to execute the application programs 233 stored in one or both of the connected memories 261 and 269. When the embedded controller 202 is initially powered up, a system program resident in the ROM 261 is executed. The application program 233 permanently stored in the ROM 261 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 249.

The application program 233 includes a sequence of instructions 262 though 263 that may include conditional branch and loop instructions. The program 233 may also include data, which is used in execution of the program 233. This data may be stored as part of the instruction or in a separate location 264 within the ROM 261 or RAM 269.

In general, the processor 205 is given a set of instructions, which are executed therein. This set of instructions may be organised into blocks, which perform specific tasks or handle specific events that occur in the emergency broadcast receiver 200. Typically, the application program 233 waits for events and subsequently executes the block of code associated with that event. Events may be triggered in response to input from a user, via the user input devices 213 of FIG. 2A, as detected by the processor 205. Events may also be triggered in response to other sensors and interfaces in the emergency broadcast receiver 200.

The execution of a set of the instructions may require numeric variables to be read and modified. Such numeric variables are stored in the RAM 269. The described methods uses input variables 267 that are stored in known locations 272, 273 in the memory 269. The input variables 267 are processed to produce output variables 277 that are stored in known locations 278, 279 in the memory 269. Intermediate variables 274 may be stored in additional memory locations in locations 265, 266 of the memory 269. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 261 or RAM 269 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 261 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the methods described below is associated with one or more segments of the application program 233, and is performed by repeated execution of a fetch-execute cycle in the processor 205 or similar programmatic operation of other independent processor blocks in the emergency broadcast receiver 200.

Figure 3:
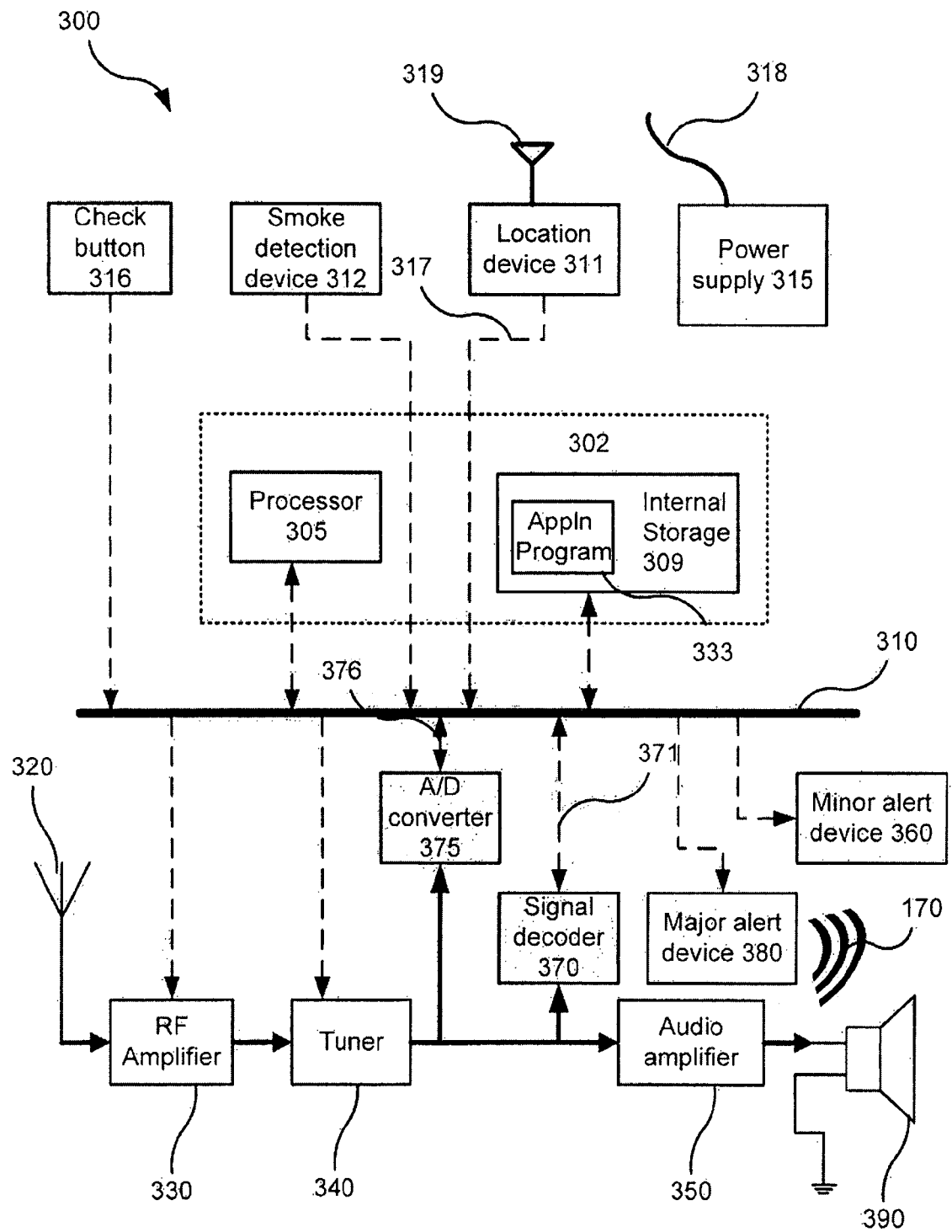
FIG. 3 is a schematic block diagram representation of an emergency broadcast receiver exemplifying the emergency broadcast receiver of the emergency alert system of FIG. 1 according to a second embodiment.

FIG. 3 is a schematic block diagram of an emergency broadcast receiver 300 exemplifying the emergency broadcast receiver 150 of the emergency alert system 100 according to a second embodiment. The emergency broadcast receiver 300 is adapted to function as a standalone alert device, without conventional radio functionality. Nevertheless, the emergency broadcast receiver 300 can operate in conventional broadcast radio bands, such as the AM and FM bands.

The components and signals 302, 305, etc. of the emergency broadcast receiver 300 are the same as the correspondingly numbered components and signals 202, 205 etc. of the emergency broadcast receiver 200. Notably however, the emergency broadcast receiver 300 has no components corresponding to the display controller 207, the display 214, or the user input device(s) 213. Instead, the emergency broadcast receiver 300 has a "check" button 316 and a smoke detector device 312. The smoke detector device 312 is a conventional smoke detector device adapted to signal to the embedded controller 302 if smoke is detected. This is to enable the emergency broadcast receiver 300 to also function as a smoke detector.

The check button 316 provides a means whereby a user of the emergency broadcast receiver 300 can check that the emergency broadcast receiver 300 is functioning correctly. The operation of the emergency broadcast receiver 300 in response to activation of the check button 316 is described in detail below with reference to FIG. 7.

The trigger signal 145 which the emergency broadcast receivers 200 and 300 are adapted to detect may be a simple but distinctive pattern indicating the presence of an emergency alert. The emergency broadcast receivers 200 and 300 are adapted to respond selectively to trigger signals that include location information imparted by the emergency authorities, as described above with reference to FIG. 1. The emergency broadcast receivers 200 and 300 compare their location data 217 and 317, as provided by their respective location devices 211 and 311, with the location information included in the trigger signal 145, and respond depending on the comparison as described in detail below.

In the case where the location devices 211 and 311 are DIP or BCD switches representing postcodes, the location information would comprise one or more postcodes. In the case where the location devices 211 and 311 are GPS receivers, as in FIG. 1, the location information represents a custom-defined area. Examples include, a circle (represented by a central point, in latitude/longitude coordinates, and a radius in kilometers) or a polygon (represented by the vertices of the polygon, in latitude/longitude coordinates), like the example area 130 in FIG. 1.

Figure 4:
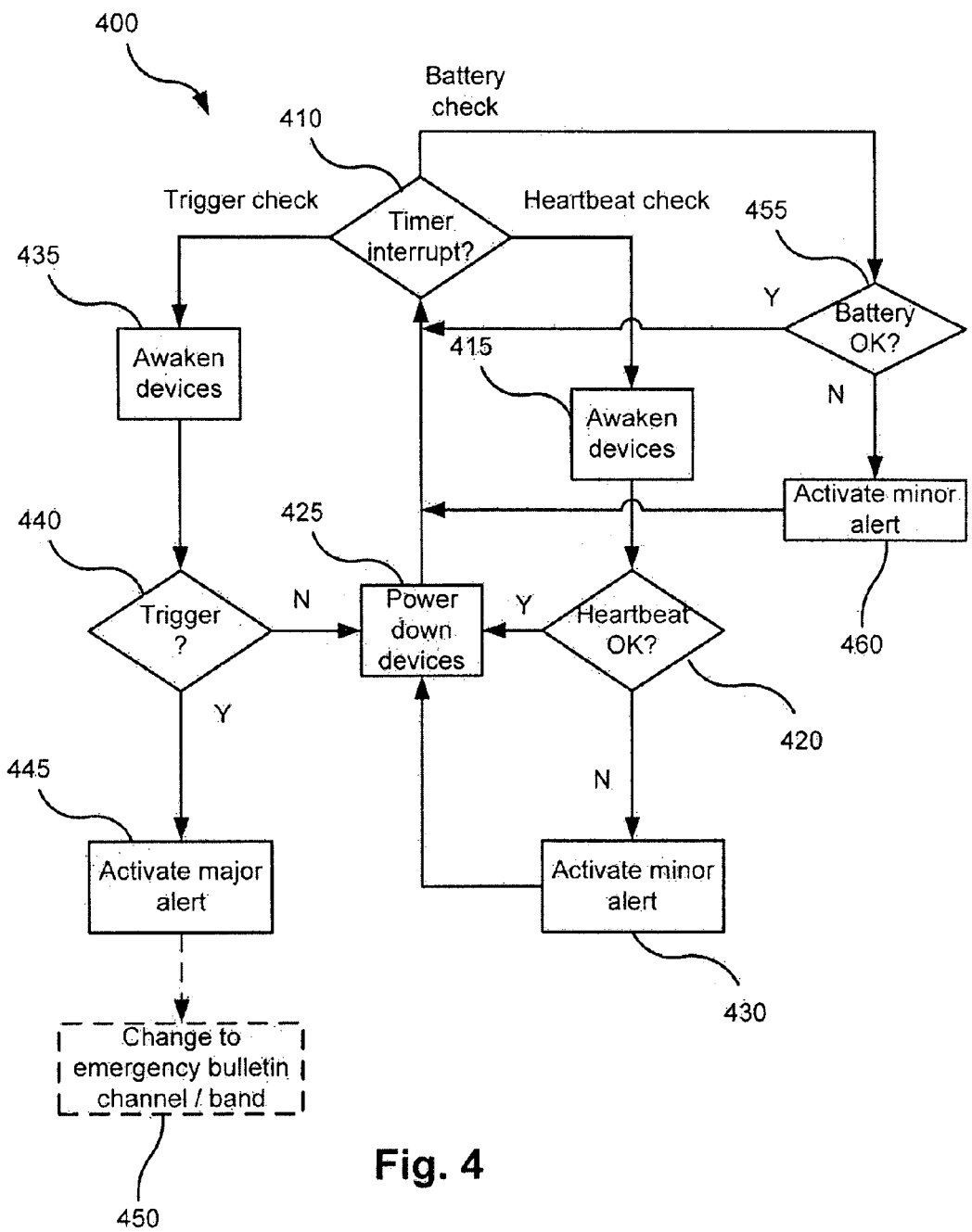
FIG. 4 is a flow chart illustrating an emergency monitoring method of operation of the emergency broadcast receiver of FIG. 2A or FIG. 3.

FIG. 4 is a flow chart illustrating an emergency monitoring method 400 of operation of the emergency broadcast receivers 200 and 300 of FIGS. 2 and 3. The method 400 is implemented in software controlled and executed by the processor 205/305 in concert with the internal storage 209/309 as described above.

The method 400 makes use of a predetermined number of "trigger channels" in each trigger modality supported by the emergency broadcast receiver 200/300. Each trigger channel corresponds to an "alert enabled" station that is configured to broadcast a trigger signal in the event of an emergency. Such "alert enabled" stations could identify themselves as such by transmitting a predetermined "heartbeat" data sequence in their corresponding channel and modality at known intervals.

The list of trigger channels may be stored before purchase in the internal storage 209/309, or manually entered by the user on configuration of the emergency broadcast receiver 200 (the emergency broadcast receiver 300 does not have an interface to support such manual entry), or, in the case where "alert enabled" stations periodically self-identify, the emergency broadcast receiver 200/300 may be adapted to self-configure by conducting an automatic scan of all channels in each modality at the known intervals, and storing as trigger channels those on which a "heartbeat" sequence is detected and therefore correspond to self-identifying "alert enabled" stations. This process is similar to that performed by self-tuning television receivers upon initial configuration.

The method 400 begins at step 410 where the processor 205/305 awaits an interrupt from one of three timers: a trigger check timer, a heartbeat check timer, and a battery check timer.

The trigger check timer interval and the duration of digital data to be buffered for trigger signal detection varies depending on the frequency and duty cycle of the transmitted trigger signal during emergencies. For example, if the trigger is of duration one second and is to be sent every thirty seconds, a trigger check timer interval of sixty seconds and a buffer duration of two seconds would generally provide for trigger detection within a reasonable interval.

The heartbeat check timer interval depends on the nature of the heartbeat check. If the heartbeat check is for a "heartbeat" sequence periodically transmitted by "alert enabled" stations, the heartbeat check timer interval would be set to coincide with such transmissions from each "alert enabled" stations in the stored list. In this case, the heartbeat check timer would need to be synchronised with absolute clock time. Otherwise, the heartbeat check timer interval is a compromise between short intervals, for robustness, and longer intervals, to improve battery life. In one implementation, the heartbeat check timer interval is thirty seconds.

A typical battery check timer interval is one hour.

If a timer interrupt is received from the battery check timer, the method 400 at step 455 checks whether the battery has sufficient charge. If so, the method 400 returns to step 410. If not, the method 400 at step 460 activates the minor alert device 260/360 and returns to step 410.

If a tinier interrupt is received from the heartbeat check timer, the method 400 at step 415 awakens the analog devices 230/330, 240/340, and one or both of the signal decoder 270/370 and the A/D converter 275/375 before proceeding to step 420 to perform the heartbeat check. Step 420 will be described in more detail below with reference to FIG. 5. If the heartbeat check at step 420 returns a positive result, the method 400 proceeds to step 425 at which the analog devices awakened at step 415 are powered down. The method 400 then returns to step 410. Otherwise, the method 400 at step 430 activates the minor alert device 260/360 before executing step 425.

If a timer interrupt is received from the trigger check timer, the method 400 at step 435 awakens the analog devices 230/330, 240/340, and one or both of the signal decoder 270/370 and the A/D converter 275/375 before proceeding to step 440 to perform the trigger check. Step 440 will be described in more detail below with reference to FIG. 6. If the trigger check returns a negative result, the method 400 proceeds to step 425, at which the analog devices awakened at step 435 are powered down. The method 400 then returns to step 410. If the trigger check at step 440 returns a positive result, the method 400 at step 445 activates the major alert device 280/380. Step 445 is followed in the first embodiment (the emergency broadcast receiver 200) by step 450, in which the processor 205 awakens the audio amplifier 250 and commands the tuner 240 to tune to a predetermined emergency bulletin frequency, on which a verbal message relating to the emergency that resulted in the sending of the trigger signal is to be broadcast.

Figure 5:
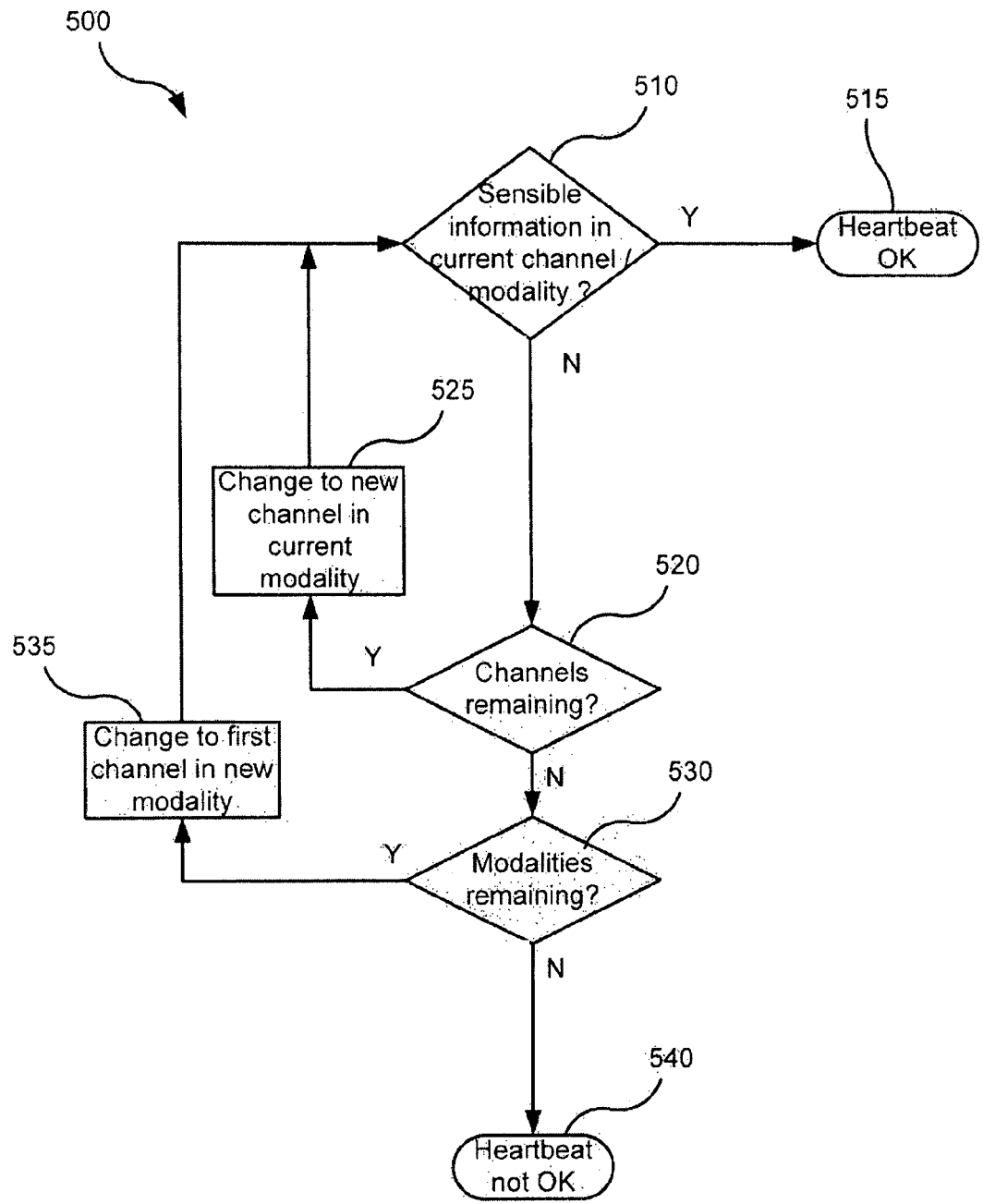
FIG. 5 is a flow chart illustrating a "heartbeat check" method carried out by the emergency broadcast receiver of FIG. 2A or FIG. 3 as part of the method of FIG. 4.

FIG. 5 is a flow chart illustrating a "heartbeat check" method 500 carried out by the emergency broadcast receiver 200/300 in step 420 of the method 400. The method 500 starts at step 510, where the processor 205/305 determines whether the current channel contains "sensible" information according to the current trigger modality. If the current modality is FM/RDS or AM/AMSS, this involves monitoring the data 271/371 from the signal decoder 270/370 to determine whether it represents a valid RDS/AMSS stream. If so, the "heartbeat check" is passed and the method 500 proceeds to step 515 where the method 500 returns a positive result. If not, the "heartbeat check" in the current channel fails, and the method 500 proceeds to step 520. In the implementation in which the "alert enabled" stations transmit a periodic "heartbeat" data sequence on their corresponding channel, step 510 further comprises monitoring the valid RDS/AMSS data stream to detect the "heartbeat" sequence. If it is not detected, the "heartbeat check" in the current channel fails, and the method 500 proceeds to step 520.

If the current modality is FM audio or AM audio, step 510 involves first checking the digital data 276/376 from the A/D converter 275/375 to determine whether the Received Signal Strength Indication (RSSI) exceeds a predetermined threshold. This indicates the current channel corresponds to a transmitting station with an acceptable received signal quality. If the threshold is exceeded, the processor 205/305 performs a "sanity check" to determine whether the digital data resembles speech, music, or some combination thereof. If so, the "heartbeat check" is passed and the method 500 proceeds to step 515 where the method 500 returns a positive result. Alternatively, the processor 205/305 determines whether the digital data resembles "static". If so, the "heartbeat check" fails in the current channel, and the method 500 proceeds to step 520.

At step 520, the method 500 determines whether there are remaining unchecked channels in the predetermined number of trigger channels for the current trigger modality. If so, the method 500 at step 525 commands the tuner 240/340 to change to an unchecked channel, and returns to step 510. If not, the method 500 at step 530 determines whether there are any trigger modalities yet to be checked for a heartbeat. If so, the method 500 at step 535 commands the tuner 240/340 to change to a first channel in the unchecked trigger modality, and then returns to step 510. If not, the method 500 at step 540 returns a negative result.

Figure 6:
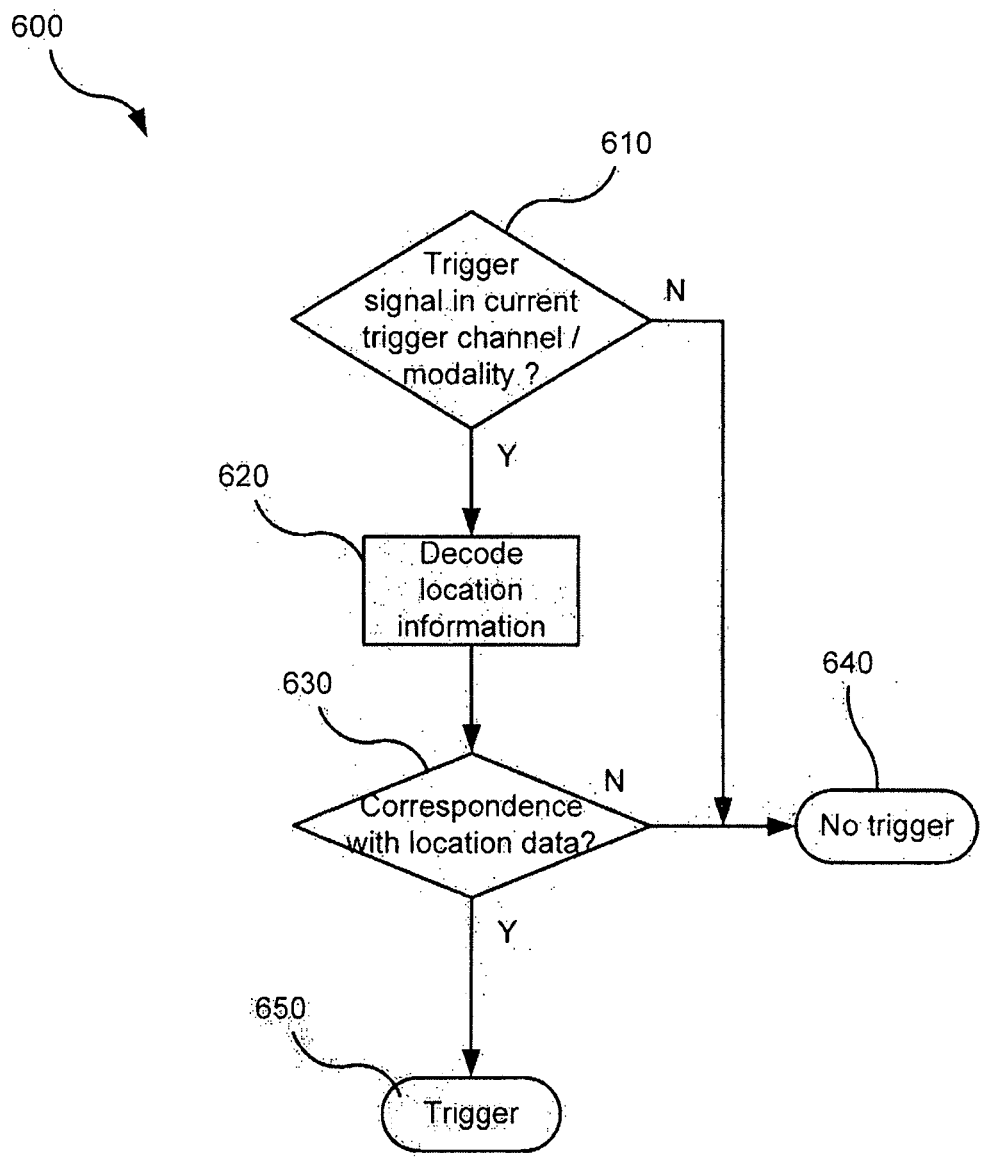
FIG. 6 is a flow chart illustrating a "trigger check" method carried out by the emergency broadcast receiver of FIG. 2A or FIG. 3 as part of the method of FIG. 4.

FIG. 6 is a flow chart illustrating a trigger check method 600 carried out by the emergency broadcast receiver 200/300 in step 440 of the method 400. The method 600 starts at step 610, where the processor 205/305 determines whether the trigger signal is present in the current channel according to the current trigger modality. If the current modality is FM/RDS or AM/AMSS, this involves monitoring the data 271/371 from the signal decoder 270/370 to determine whether the RDS/AMSS stream contains the predetermined trigger signal. If the current modality is FM audio or AM audio, step 610 involves monitoring the digital data 276/376 from the A/D converter 275/375 to determine whether the digital data contains the audio-based trigger signal as described above.

If the trigger signal is not detected at step 610, the method 600 proceeds to step 640, where the method 600 returns a negative result. If the trigger signal is detected, the method 600 proceeds to step 620. At step 620, the method 600 decodes the location information encoded in the detected trigger signal. At the next step 630, the method 600 determines whether the decoded location information corresponds with the receiver location data 217/317 from the location device 211/311.

The nature of the correspondence determined at step 630 depends on the nature of the decoded location information and the receiver location data 217/317. If the location information is one or more zone descriptors at a certain resolution, such as suburb descriptors, and the receiver location data 217/317 represents the location of the emergency broadcast receiver in multiple resolutions, for example, state, region, municipality, and suburb, correspondence is, found if one of the zone descriptors in the decoded location information matches the portion of the receiver location data 217/317 representing the same resolution. If the location information represents a circular or polygonal area, and the receiver location data 217/317 represents a point location, correspondence is found if the receiver location is within the circular or polygonal area, which may be determined using conventional geometric methods.

If correspondence is not found at step 630, the method 600 proceeds to step 640, where the method 600 returns a negative result. If correspondence is found at step 630, the method 600 proceeds to step 650, where the method 600 returns a positive result.

Figure 7:
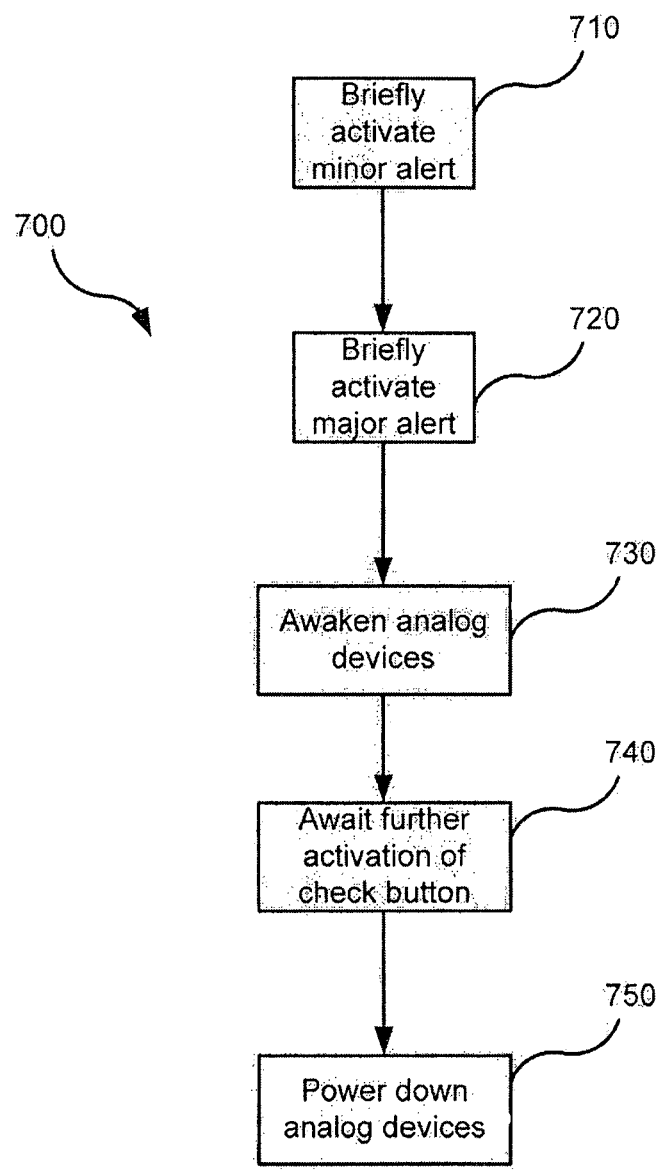
FIG. 7 is a flow chart illustrating a "check" method carried out by the emergency broadcast receiver of FIG. 3.

FIG. 7 is a flow chart illustrating a "check" method 700 carried out by the emergency broadcast receiver 300 in response to activation of the "check" button 316. The method 700 starts at step 710 where the processor 305 briefly activates the minor alert device 360. Step 720 follows, at which the processor 305 briefly activates the major alert device 380. At the next step 730, the processor 305 awakens the analog devices 330, 340, 350, and 390 so that the user can confirm by ear that the currently tuned channel represents a transmitting station. The method 700 at step 740 awaits a further activation of the "check" button 316 before powering down the awakened analog devices at step 750. The method 700 then concludes.

The arrangements described are applicable to the emergency response industries.

The foregoing describes only some embodiments of the present invention, and modifications and/or changes can be made thereto without departing from the scope and spirit of the invention, the embodiments being illustrative and not restrictive.

The invention claimed is:

1. An emergency broadcast receiver comprising:
 an alert device;
 a tuner adapted to demodulate a baseband signal from a radio frequency signal;
 a signal decoder adapted to extract digital data from the demodulated baseband signal;
 a location device adapted to provide location data representing a location of the emergency broadcast receiver; and
 an embedded controller adapted to:
  determine periodically whether the extracted digital data represents a data stream validly encoded according to a trigger modality of the emergency broadcast receiver, and where the data stream is determined to be validly encoded according to the trigger modality of the emergency broadcast receiver;
  detect a trigger signal in the data stream;
  determine whether location information encoded in the detected trigger signal corresponds with the location data; and
  activate, based on a determination that the information encoded in the detected trigger signal corresponds with the location data, the alert device.

2. An emergency broadcast receiver according to claim 1, wherein the alert device comprises one or more of the group consisting of: one or more light emitting diodes (LEDs); a high-pitched audio tone emitter; a low frequency tone emitter, and an interface to a public address system.

3. An emergency broadcast receiver according to claim 1, wherein the radio frequency signal is an amplitude modulation (AM) band signal, and the signal decoder is adapted to extract digital data according to the amplitude modulation signaling system (AMSS) protocol.

4. An emergency broadcast receiver according to claim 1, wherein the radio frequency signal is an frequency modulation (FM) band signal, and the signal decoder is adapted to extract digital data according to the radio data system (RDS) protocol.

5. An emergency broadcast receiver according to claim 1, wherein the location device is a global positioning system (GPS) receiver/decoder, and the location data represents a point location of the emergency broadcast receiver in latitude/longitude coordinates.

6. An emergency broadcast receiver according to claim 5, wherein the determining whether location information encoded in the detected trigger signal corresponds with the location data comprises determining whether the point location of the emergency broadcast receiver is within an area specified by the location information.

7. An emergency broadcast receiver according to claim 1, wherein the location device is a memory device, and the location data represents the location of the emergency broadcast receiver as one or more numeric codes, each numeric code indicating one of a predetermined set of zones at a corresponding resolution.

8. An emergency broadcast receiver according to claim 7, wherein the location information is one or more zone descriptors, and the determining whether location information encoded in the detected trigger signal corresponds with the location data comprises determining whether one of the zone descriptors matches one or more of the numeric codes at the same resolution as the one zone descriptor.

9. An emergency broadcast receiver according to claim 1, wherein the tuner is adapted to demodulate a baseband signal from a radio frequency signal in a current one of a predetermined number of channels, and the embedded controller is further adapted to change, based on the first determining, the current channel at which the tuner demodulates to a different channel of the predetermined number of channels.

10. An emergency broadcast receiver according to claim 1, wherein the tuner is adapted to demodulate a baseband signal from a radio frequency signal in a current one of a predetermined number of modalities, and the embedded controller is further adapted to change, based on the first determining, the current modality at which the tuner demodulates to a different modality of the predetermined number of modalities.

11. An emergency broadcast receiver according to claim 1, further comprising a minor alert device, wherein the embedded controller is further adapted to, based on the first determining, activate the minor alert device.

12. An emergency broadcast receiver comprising:
an alert device;
a tuner adapted to demodulate a baseband signal from a radio frequency signal;
an analog-to-digital converter adapted to convert the demodulated baseband signal to digital data;
a location device adapted to provide location data representing a location of the emergency broadcast receiver; and
an embedded controller adapted to:
  determine periodically whether the extracted digital data represents a data stream validly encoded according to a trigger modality of the emergency broadcast receiver, and where the data stream is determined to be validly encoded according to the trigger modality of the emergency broadcast receiver;
  detect a trigger signal in the data stream;
  determine whether location information encoded in the detected trigger signal corresponds with the location data; and
  activate, based on a determination that the location information encoded in the detected trigger signal corresponds with the location data, the alert device.

13. An emergency broadcast receiver according to claim 12, wherein the trigger signal is encoded in the baseband signal as dual-tone multi-frequency (DTMF) data.

14. An emergency alert system comprising:
an operator terminal adapted to provide location information representing an area associated with an emergency;
a transmitter station adapted to broadcast a trigger signal including the location information received from the operator terminal; and
an emergency broadcast receiver as claimed in claim 1.

15. An emergency broadcast receiver according to claim 1, wherein determining whether the extracted digital data stream is validly encoded according to the trigger modality of the emergency broadcast receiver comprises:
  determining if a Received Signal Strength Indication (RSSI) of the extracted digital data stream is above a predetermined threshold, and
  if the RSSI is above the predetermined threshold, determining that the extracted digital data resembles at least one of speech and music.

* * * * *